(12) United States Patent
Liu

(10) Patent No.: US 11,885,701 B2
(45) Date of Patent: Jan. 30, 2024

(54) BICYCLE TORQUE DETECTOR

(71) Applicant: Jen-Chih Liu, Kaohsiung (TW)

(72) Inventor: Jen-Chih Liu, Kaohsiung (TW)

(73) Assignee: NEW KAILUNG GEAR CO., LTD, Kaohsiung (TW)

( * ) Notice: Subject to any disclaimer, the term of this patent is extended or adjusted under 35 U.S.C. 154(b) by 16 days.

(21) Appl. No.: 17/745,892

(22) Filed: May 17, 2022

(65) Prior Publication Data

US 2023/0393000 A1 Dec. 7, 2023

(51) Int. Cl.
*G01L 3/04* (2006.01)
*B62J 45/411* (2020.01)
*B62J 45/421* (2020.01)

(52) U.S. Cl.
CPC ............... *G01L 3/04* (2013.01); *B62J 45/411* (2020.02); *B62J 45/421* (2020.02)

(58) Field of Classification Search
CPC .......... G01L 3/04; B62J 45/411; B62J 45/421
See application file for complete search history.

(56) References Cited

U.S. PATENT DOCUMENTS

| | | | | |
|---|---|---|---|---|
| 5,014,560 A | * | 5/1991 | Hutchison | G01L 3/1421 73/862.324 |
| 8,485,050 B2 | * | 7/2013 | Yao | B62J 45/421 73/862.08 |
| 8,646,560 B2 | * | 2/2014 | Chan | B62M 25/08 180/206.3 |
| 10,312,775 B2 | * | 6/2019 | Wang | B62M 6/50 |
| 10,479,444 B2 | * | 11/2019 | Kao | G01L 3/1428 |
| 11,286,979 B2 | * | 3/2022 | Rossberger | F16D 41/12 |
| 2015/0192483 A1 | * | 7/2015 | Liu | B62M 6/45 73/862.321 |
| 2018/0072376 A1 | * | 3/2018 | Kao | B62J 45/411 |
| 2020/0063793 A1 | * | 2/2020 | Rossberger | B62M 6/50 |

* cited by examiner

*Primary Examiner* — Freddie Kirkland, III

(57) ABSTRACT

A bicycle torque detector includes a crank shaft formed with a first ring section and a second ring section; the first ring section serving for receiving a deformation sleeve accommodating ring and a deformable sleeve; the second ring section serving for receiving a circuit board ring; a circular casing serving to enclose all the crank shaft, the elastic ring, the sleeve, and the circuit board ring; wherein the first ring section of the crank shaft is formed with at least one resisting portion; the deformable sleeve has at least one resisting portion; the resisting portion of the crank shaft resists against one end of the deformation sleeve accommodating ring; another end of the deformation sleeve accommodating ring resists against the resisting portions of the deformable sleeve. A rear end of the deformable sleeve is engaged to a chain sleeve. The deformation sleeve accommodating ring is adhesive with sensing sheet.

4 Claims, 5 Drawing Sheets

BICYCLE TORQUE DETECTOR

FIELD OF THE INVENTION

The present invention relates to bicycles, and in particular to a bicycle torque detector.

BACKGROUND OF THE INVENTION

Generally, torque detectors for bicycles are installed on the crank shaft or the hub of a bicycle. As known in the art, they generally have the defects of too complicated structures, too many elements, bad space arrangement, occupying a large space, being heavy, and others. These defects seriously affect utilities of torque detectors.

Therefore, there is an eager demand for a novel torque detector for bicycle which occupies a small space, has a simple structure, lower cost, being light with high precise in detection.

SUMMARY OF THE INVENTION

Accordingly, the object of the present invention is to provide a bicycle torque detector, wherein the structure of the present invention has the advantages of simple structure, low cost, light weighted, precise, etc with the effects of good industrial utilities and economics.

To achieve above object, the present invention provides a bicycle torque detector, comprising: a crank shaft formed with a first ring section and a second ring section; the first ring section serving for receiving a deformation sleeve accommodating ring and a deformable sleeve; the second ring section serving for receiving a circuit board ring; a circular casing serving to enclose all the crank shaft, the elastic ring, the sleeve, and the circuit board ring; wherein the first ring section of the crank shaft is formed with at least one resisting portion; the deformable sleeve has at least one resisting portion; the resisting portion of the crank shaft resists against one end of the deformation sleeve accommodating ring; another end of the deformation sleeve accommodating ring resists against the resisting portions of the deformable sleeve.

In the torque detector, the first ring section of the crank shaft is formed with the resisting portions the number of which is identical to that of the deformation sleeve accommodating ring.

In the torque detector, the deformable sleeve has the at least one resisting portion the number of which is identical to that of the deformation sleeve accommodating ring.

In the bicycle torque detector, a rear end of the deformable sleeve is engaged to a chain sleeve.

In the bicycle torque detector, the deformation sleeve accommodating ring is adhesive with sensing sheet which is signally connected to the circuit board ring.

In the bicycle torque detector, the casing is formed with at least one penetrating hole which is communicated to the circuit board ring.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
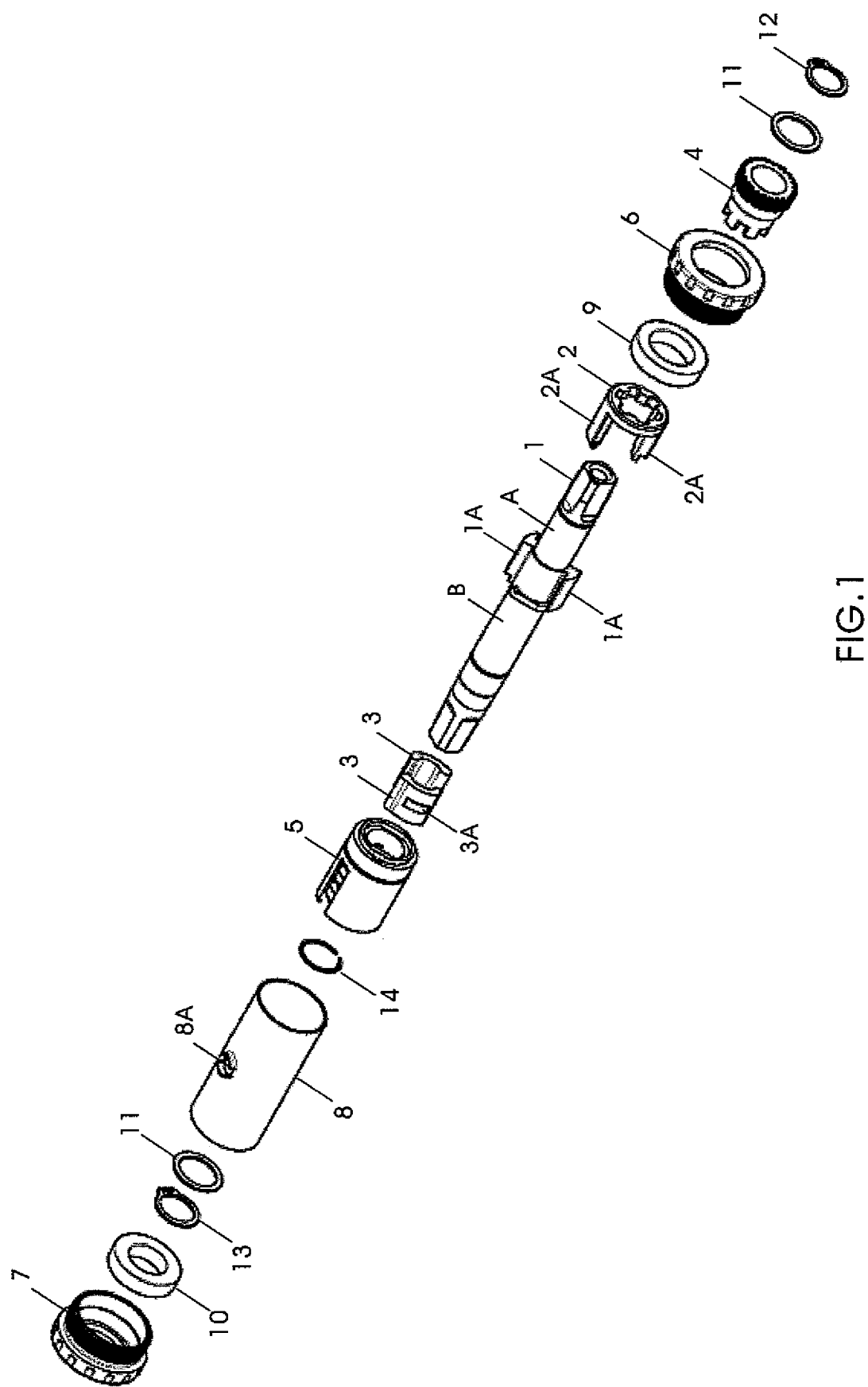
FIG. 1 is a schematic view of the embodiment of the present invention.
Figure 2:
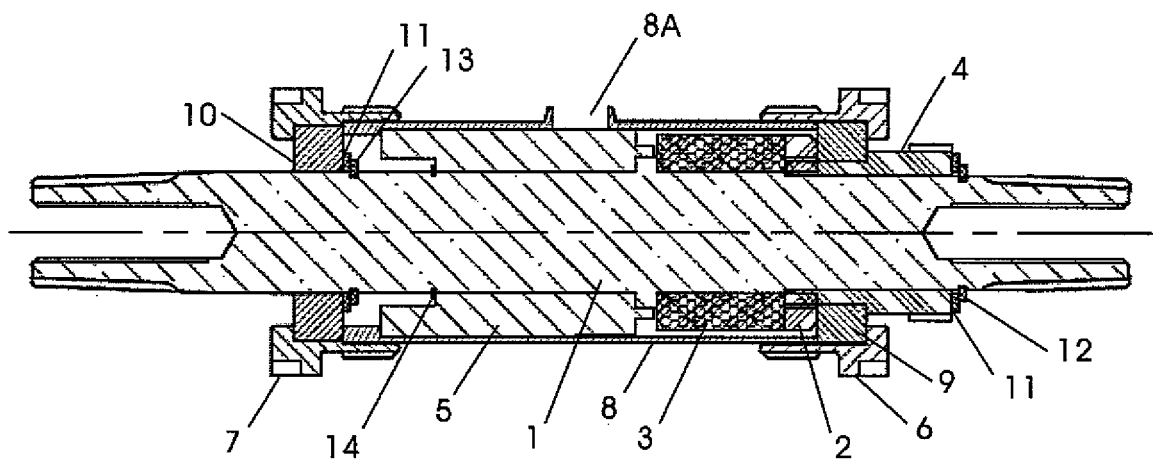
FIG. 2 is a cross sectional view of the embodiment of the present invention after assembly.
Figure 3:
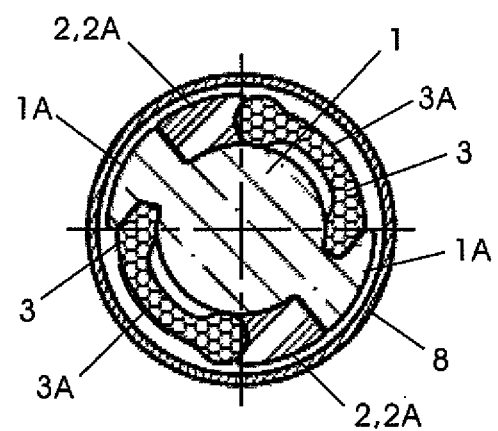
FIG. 3 is a cross sectional view along line A-A of FIG. 2.

Referring to FIGS. 1 to 3, the structure of the present invention is illustrated.

In the present invention, the circular casing 8 encloses the crank shaft 1, the deformation sleeve accommodating ring 3, and the circuit board ring 5. Bearings 9 and 10 are installed at two end of the crank shafts 1 and between an inner circular wall and an outer side of the crank shaft 11. Each bearing 9, 10 resists against a respective C ring 12, 13 which enclose the crank shaft 1. A washer 14 encloses the crank shaft 5 and resists against the bearing 10 to prevent the bearing 10 from movement. Two end covers 6 and 7 cover at two outer ends of the crank shaft 7 and cover the two bearings 9 and 10.

In the following, the structure of the present invention will be described in detail.

The crank shaft 1 is formed with a first ring section A and a second ring section B. The first ring section A serves to receive a deformation sleeve accommodating ring 3 and a deformable sleeve 2. The second ring section B serves for receiving a circuit board ring 5. The circular casing 8 serves to enclose the crank shaft 1, the deformation sleeve accommodating ring 3, the sleeve 2, and the circuit board ring 5. An elastic washer 14 enclosed the crank shaft 1, one end thereof resisting against the circuit board ring 5 to fix the circuit board ring 5 without sliding.

Figure 4:
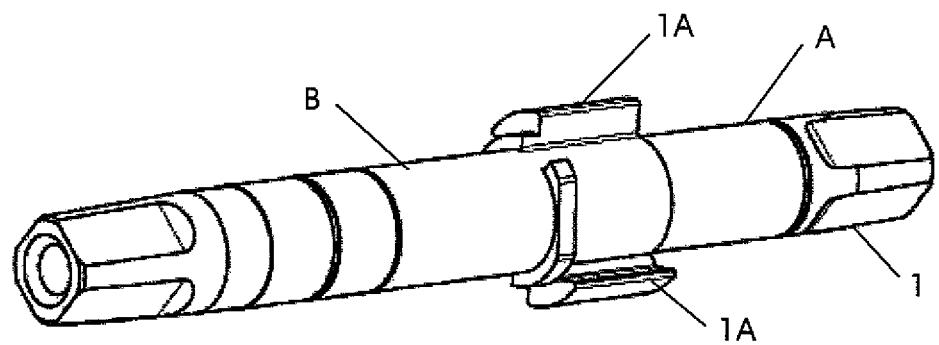
FIG. 4; is a perspective view of the crank shaft of the embodiment of the present invention.
Figure 5:
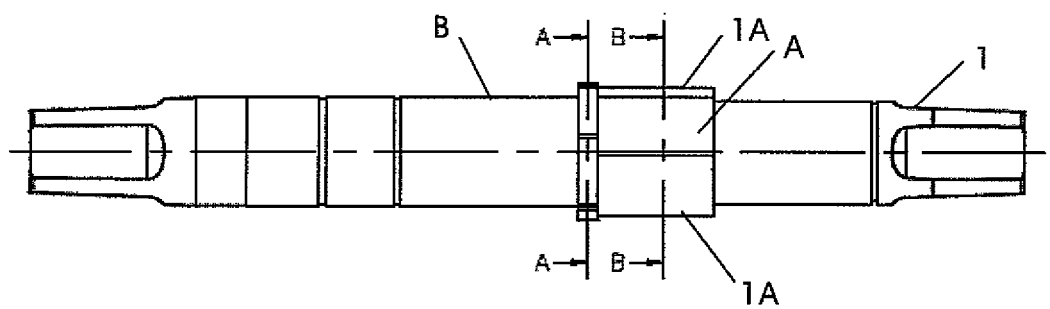
FIG. 5 shows the crank shaft of the embodiment of the present invention.
Figure 6:
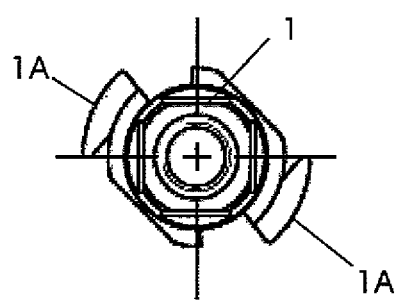
FIG. 6 is a left side view of FIG. 5.
Figure 8:
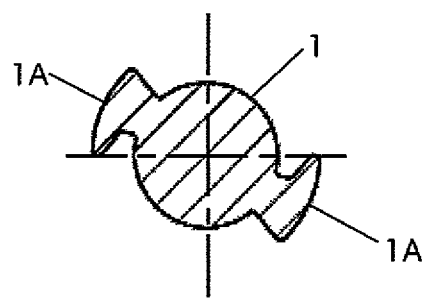
FIG. 8 is a cross sectional view along line B-B of FIG. 5.
Figure 7:
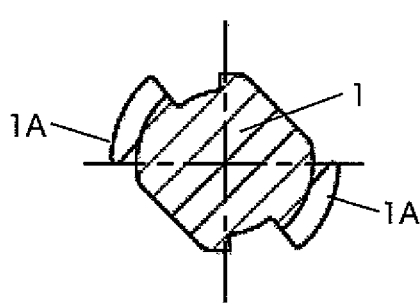
FIG. 7 is a cross sectional view along line A-A of FIG. 5.
Figure 9:
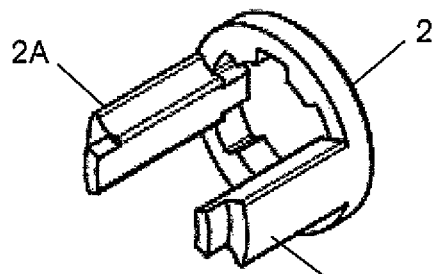
FIG. 9 is a perspective view showing the deformable sleeve of embodiment of the present invention.
Figure 13:
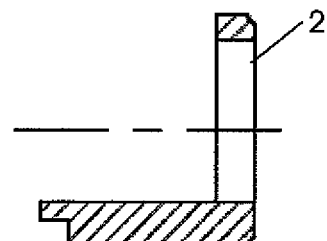
FIG. 13 is a cross sectional view along line A-A of FIG. 11.
Figure 11:
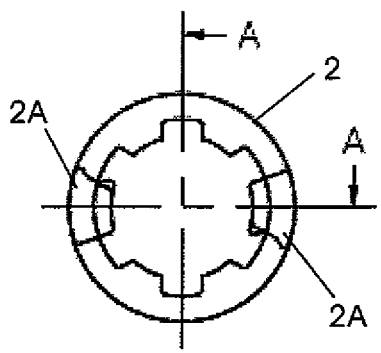
FIG. 11 is a left side view of FIG. 10.
Figure 10:
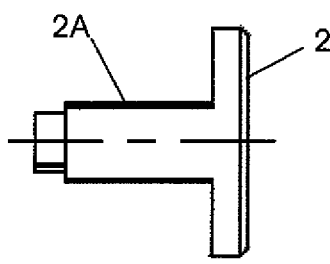
FIG. 10 shows the deformable sleeve of the embodiment of the present invention.
Figure 12:
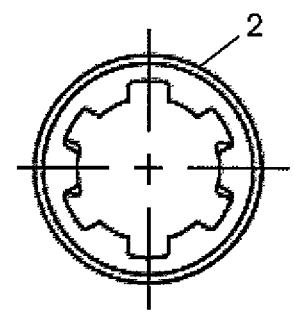
FIG. 12 is a right side view of FIG. 10.
Figure 14:
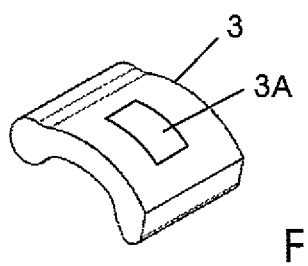
FIG. 14 is a perspective view showing the deformation sleeve accommodating ring of the embodiment of the present invention.
Figure 15:
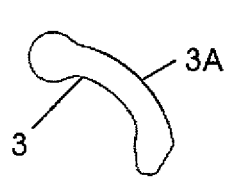
FIG. 15 showing the deformation sleeve accommodating ring of the present invention.
Figure 16:
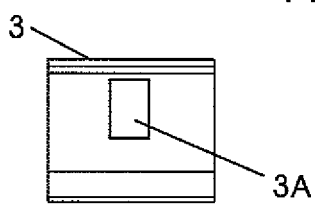
FIG. 16 is a right side view of FIG. 15 of the present invention.

With reference to FIGS. 2 and 3, the first ring section A of the crank shaft 1 (referring to FIGS. 4 and 8) is formed with resisting portions 1A the number of which is identical to that of the deformation sleeve accommodating ring 3. One end of the resisting portion 1A resists against a side of the deformation sleeve accommodating ring 3. The deformable sleeve 2 is engaged to a chain cylinder 4. The deformable sleeve 2 (referring to FIGS. 3, 9 and 13) has at least one resisting portion 2A the number of which is identical to that of the deformation sleeve accommodating ring 3. The resisting portions 2A of the deformable sleeve 2 resist against another end of the deformation-sleeve accommodating ring 3. One end of the deformation sleeve accommodating ring 3 (referring to FIGS. 3, 14 and 16) resists against the resisting portions 1A of the crank shaft 4 and another end of the deformation sleeve accommodating ring 3 resists against the resisting port-ions 2A of the deformable sleeve 2. The deformation sleeve accommodating ring 3 is adhesive with sensing sheet 3A which is signally connected to the circuit board ring 5.

With reference to FIGS. 1 and 2, the circular casing 8 encloses the crank shaft 1, the deformation sleeve accommodating ring 3, and the circuit board ring 5. The casing 8 is formed with at least one penetrating hole 8A which is communicated to the circuit board ring 5.

Figure 17:
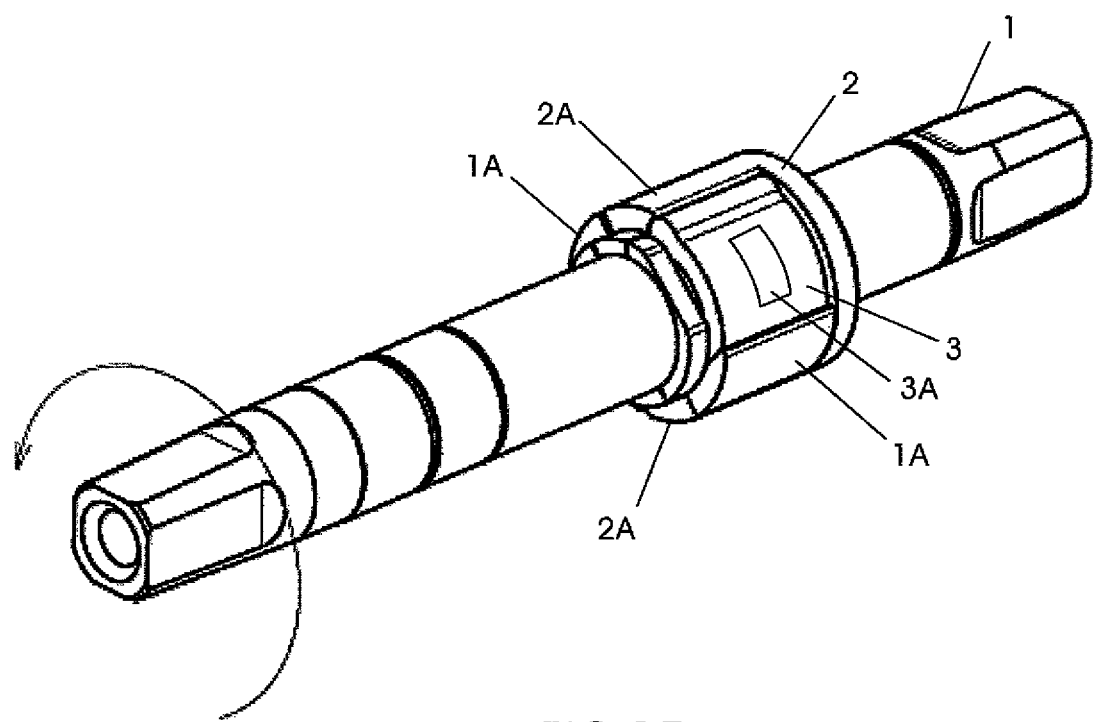
FIG. 17 is an assembled view of the crank shaft, deformable sleeve and deformation sleeve accommodating ring of the present invention.

Referring to FIGS. 2, 3 and 17, by one end of the deformation sleeve accommodating ring 3 resisting against the crank shaft 1 and another end of the deformation sleeve accommodating ring 3 resisting against the deformable sleeve 2, a rear end of the deformable sleeve 2 is engaged to a chain sleeve 4. When the crank shaft 4 drives the chain sleeve 4 to rotate, the torque of the crank shaft 4 will deform the resisting portions 1A of the crank shaft 1 and the resisting portions 2A of the second ring section B. The deformation will be detected by the sensing sheet 3A of the deformation sleeve accommodating ring 3 and the values of the deformation are transferred to the circuit board ring 5 for determining variations of the torque.

In summary, the structure of the present invention has the advantages of simple structure, low cost, light weighted, precise, etc with the affects of industrial utilities and economics.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A bicycle torque detector, comprising:
    a crank shaft (1) formed with a first ring section (A) and a second ring section (B); the first ring section (A) being for receiving a deformation sleeve accommodating ring (3) and a deformable sleeve (2);
    the second ring section serving for receiving a circuit board ring (5);
    a circular casing (8) for enclosing all the crank shaft (1), the deformation sleeve accommodating ring (3), the sleeve (2), and the circuit board ring (5);
    wherein the first ring section (A) of the crank shaft (1) is formed with at least one resisting portion (1A); the deformable sleeve (2) has at least one resisting portion (2A); the resisting portion (1A) of the crank shaft (1) resists against one end of the deformation sleeve accommodating ring (3); another end of the deformation sleeve accommodating ring (3) resists against the resisting portions (2A) of the deformable sleeve (2);
    wherein the deformation sleeve accommodating ring (3) is adhesive by a sensing sheet (3A) which is signally connected to the circuit board ring (5); and
    wherein by the one end of the deformation sleeve accommodating ring (3) resisting against the crank shaft (1) and the another end of the deformation sleeve accommodating ring (3) resisting against the deformable sleeve (2), a rear end of the deformable sleeve (2) is engaged to a chain sleeve (4); when the crank shaft (4) drives the chain sleeve (4) to rotate, the torque of the crank shaft (4) deforms the resisting portions (1A) of the crank shaft (1) and the resisting portions (2A); the deformation is detected by the sensing sheet (3A) of the deformation sleeve accommodating ring (3) and values of the deformation are transferred to the circuit board ring (5) for determining variations of the torque.

2. The bicycle torque detector as claimed in claim 1, wherein the first ring section of the crank shaft (1) is formed with the resisting portions (1A) the number of which is identical to that of the deformation sleeve accommodating ring (3).

3. The bicycle torque detector as claimed in claim 1, wherein the deformable sleeve (2) has the at least one resisting portion (2A) the number of which is identical to that of the deformation sleeve accommodating ring (3).

4. The bicycle torque detector as claimed in claim 1, wherein the casing (8) is formed with at least one penetrating hole (8A) which is communicated to the circuit board ring (5).

* * * * *